United States Patent Office 3,843,324
Patented Oct. 22, 1974

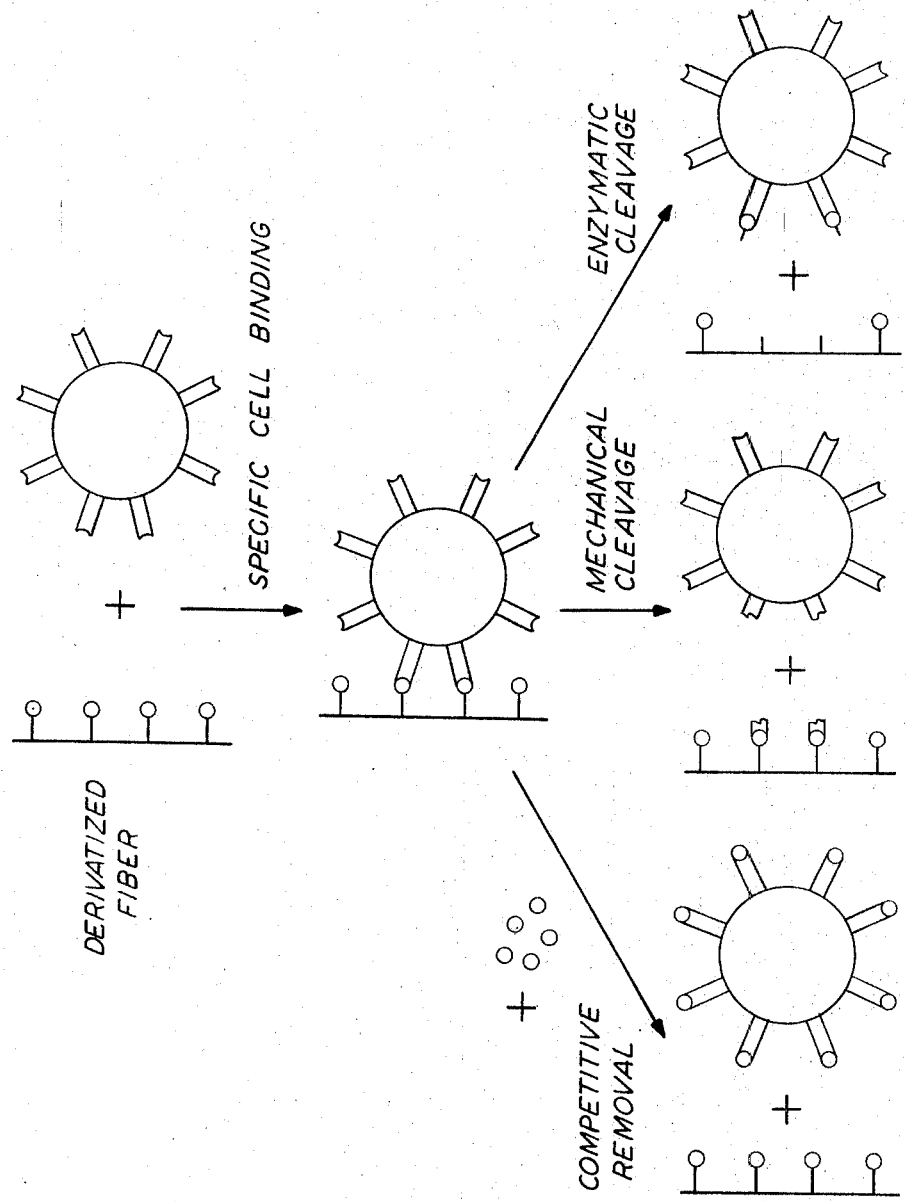

3,843,324
METHOD OF CELL FRACTIONATION AND APPARATUS THEREFOR
Gerald M. Edelman, John L. Wang, Urs S. Rutishauser, and Clarke F. Millette, New York, N.Y., assignors to Research Corporation, New York, N.Y.
Filed Sept. 13, 1972, Ser. No. 288,815
Int. Cl. G01n 33/16
U.S. Cl. 23—230 B                              23 Claims

ABSTRACT OF THE DISCLOSURE

Fibers, suitably in filament form, are tensioned on a frame or woven in the form of a substantially rigid mesh and materials containing immunoreactive groups are bonded thereto. The combination is lyophilized to provide a stable device which is used to selectively remove cells, having predetermined immunoreactive factors attached thereto which have molecular complementarity with the aforementioned materials containing immunoreactive groups, from fluids containing said cells.

DESCRIPTION OF THE PRIOR ART

The detection of predetermined cells and suitably their selective removal from body fluids containing them for purposes of diagnosis or experimentation has been a problem receiving a great deal of attention. It is well known in the immunologic art that cells bear upon their surface certain materials designated as antibodies which react specifically with certain other materials designated as antigens. This propensity has been much used in diagnostic tests wherein a solid carrier is coated with the antigen material, the body fluid suspected of containing certain types of cells having antibodies to said antigen is added thereto and, if the suspected antibodies are present upon the cells agglutination results which may be optically observed. The antigen may also be on the cell in which case the antibody is coated onto the carrier.

Such a method however does not provide a means of isolating the detected cells or carrying out any experimentation upon them. It has been known to bond proteins to suitable surfaces such as nylon in order to provide a biologically reactive surface which does not pass into solution and which is readily removable from the body fluid after the reaction has taken place. An example of this is the bonding of ureas to nylon (Sunderan and Hornby, Febs Letters, 10, 325 (1970)). In another variation of this technique an antigen may be coated upon polyacrylamides and, after the cells undergo immunologic bonding with the antigen a competing antigen is introduced which will replace the antigen on the polyacrylamide thus releasing the adsorbed cells. The great disadvantage of this particular method of cell fractionation is that it basically alters the chemical surface characteristics of the cells since many if not all of the antibody sites are bonded to previously free soluble antigens, that is to say, the competing introduced antigen. It would be highly desirable to provide a method of substantially clean separation of the cells from the antigen so that the separated cells are substantially if not totally of the same chemical surface characteristic as they had in their parent fluid from which they were abstracted.

It would also be desirable to provide a means for selectively adsorbing cells in such a manner that operations can be carried out upon single cells.

It would further be desirable to provide a substantially stable "library" of substrates having predetermined immunoreactive groups suitably, proteins adsorbed thereon in order to facilitate the rapid and selective analysis of body fluids for detection of various disorders for example, the presence of dormant serum hepatitis cells and the cells of sickle cell anemia, which although both detectable by currently available means when present in high concentrations present problems of detection in certain phases of these diseases when they are present in extremely low concentrations.

SUMMARY OF THE INVENTION

The invention described herein was made in the course of work under a grant or award from the Department of Health, Education and Welfare.

There is provided a novel method of fractionating cells from body fluids containing the same storable device for carying out the method.

Monofilament fibers, comprising potentially immunoreactive groups, are attached to a holding frame under tension. In an alternate embodiment of the invention the filaments are woven into a substantially rigid mesh. The fibers, either in the tensioned form or in the mesh form are treated with a material containing predetermined immunoreactive groups and a coupling agent whereby the material, suitably a protein, is coupled to the surface of the fibers.

Heretofore, it has been known that proteins may be preserved in the dry state by the process known as lyophilization, whereby the wet protein is frozen and the aqueous content removed by sublimation. The lyophilization of certain proteins bonded to the surface of certain polymers or tubes has been reported (Levin et al., Biochem., 3, 1905 (1964); Barber et al., Carbohyd. Res., 8, 491, (1968); Barber et al., ibid., 14, 287 (1970). In order to carry out the process of the present invention the fibers must be under tension in a holder or in a mesh wherein a holding effect similar to tension is achieved. Attempts to carry out lyophilization upon the coated fibers under tension or the coated meshes destroyed the antigenic activity of the bonded proteins. It is necessary to totally immerse the fibers under the surface of water, and freeze the water in such a way that the fibers are entirely coated with ice. Thereafter sublimation of the ice under reduced pressure yields a coating of lyophilized protein which is in no way denatured and which upon the readdition of water yields the antigenically active substance.

The thus produced coated fibers either under tension or in mesh form have a substantially indefinite shelf life.

In order to remove cells bearing predetermined immunoreactive factors from fluids containing the same, the fibers either under tension or in mesh form having predetermined immunoreactive groups adsorbed thereon which have molecular complementarity with the immunoreactive factors on the cells which it is desired to isolate and form bonds with said factors are immersed in the fluids containing said cells. The fibers are then agitated in the solution. In the modification where fibers under tension are employed, the fibers may not be permitted to pass through the surface layers of the medium since the surface tension will strip the cells therefrom. Therefore any changes of medium must be carried out by serial dilution.

In the case of the mesh, the interstices of the mesh retain sufficient fluid therebetween to counteract the stripping action of the surface layer and therefore the mesh may be transferred from, say, the fluid containing the cells to be abstracted, into a washing medium and thence into a release medium.

Where it is desired to release the cells abstracted, the fibers, under tension, are lightly stroked by mechanical means. The vibration caused thereby is sufficient to break the antigen-antibody coupling bond and propel the cells into the release medium prepared for them. It should be noted that this mechanical method of release will remove a minute portion of the cell membrane. By appropriate adjustment of the density of antigen coating on the fibers this damage can, if desired, be minimized to the extent that the cell, being a living organism, will itself repair the damage, or alternatively may be maximized in order to provide access to the interior portion of the cell where chemical experimentation therewith may be carried out. Where the fibers are in the mesh form cells are released by directing a fine but strong jet of water thru the mesh.

It should be noted that while coating and lyophilization may be carried out on fibers or filaments in their mechanically unoriented form, the product obtained thereby is of substantially small utility. The lyophilized layer although stable in the biological sense is extremely sensitive to mechanical handling. Thus, for example, coated fibers cannot readily be wound onto a reel and then unwound or woven into a mesh or tensioned into a carrier. Such mechanical handling would, without complex precautions, denature substantially all of the coating. Therefore, it is necessary to place the fibers into the mechanical form, that is to say, under tension or in a substantially rigid web, in which it is desired to use them prior to the coupling and lyophilization process.

The invention described herein was made in the course of work under a grant or award from the Department of Health, Education and Welfare.

BRIEF DESCRIPTION OF THE DRAWINGS

FIG. 5 is a diagrammatic representation of the competitive removal means of the prior art together with the mechanical cleavage means of the present invention.

DESCRIPTION OF THE PREFERRED EMBODIMENTS

Figure 1:
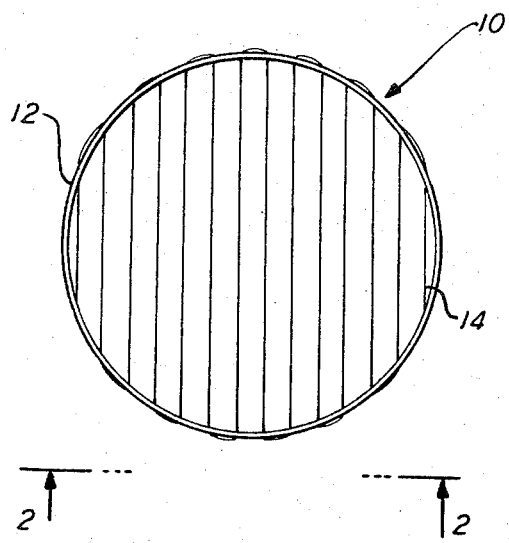
FIG. 1 is a plan view of fibers in a tensioning frame.
Figure 2:
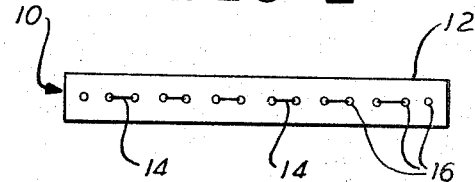
FIG. 2 is a side elevational view of the fibers and frame of FIG. 1 view from 2—2.

The basic device of the present invention comprises a plurality of mechanically oriented fibers. In one embodiment of this invention as illustrated in FIG. 1 there is provided a frame 12 having a plurality of small holes 16 in the principal plane of said frame. The fibers 14 utilized are threaded across said frame suitably but not essentially in substantially mutually parallel orientation. The degree of tension applied to the fibers is not critical, it should merely be sufficient to permit the fibers, when wet to remain in substantially their original orientation. While the dimensions of the fibers are not critical, it has been found useful to utilize fibers lying in the range of 1 micron to 250 microns suitably 50 to 150 microns, preferably about 125 microns in diameter.

The mutually supportive effect obtained by threading the fibers through a frame may be obtained, with additional advantages as discussed above, by weaving the fibers into a flexible mesh, which nevertheless has sufficient rigidity to be self-supportive when held at one point of its edge. It has been found satisfactory to utilize meshes comprising a first set of mutually parallel fibers in combination with a second of mutually parallel fibers woven perpendicularly to said first set of fibers. However, this orientation is utilized merely because meshes of this nature are inexpensive and readily obtained. It would be equally satisfactory to utilize meshes containing more than 2 sets of mutually parallel fibers and similarly said sets of fibers could be oriented at angles other than perpendicular to each other.

The fibers used in the mesh may be of diameter between 1 and 250 microns suitably between 50 and 150 microns and be separated by a distance of between 10 microns to about 1500 microns, suitably from 100 to about 500 microns. Any fibers may be utilized for the purposes of the present invention. There may be used natural polymers, for example, polymers having a carbohydrate back-bone such as cotton or silk, or semi-synthetic fibers such as rayon; there may also be utilized fibers having amino acid back-bones such as casein, and semi-synthetic polymers such as Vicara and Ardil. There may also be utilized synthetic polymers. While hydrocarbon polymers and halocarbon polymers such as polyethylene, polypropylene, and polyvinyl chloride may be activated either at their surfaces by the use of strong activating agents such as concentrated sulfuric acid or by incorporating therewith a copolymer having active sites, it is generally preferred to utilize fibers having potentially active groups such as polyamides, for example, Nylon, Nylon 60 or Nomex; polyesters such as Dacron or Terylene or polyacrylics such as Orlon, Dralon or Acrilan. It is generally preferred to utilize synthetic polymers rather than natural polymers since it is easier to control the specificity of reaction with the immunoreactive centers in the former than in the latter. Furthermore, among the synthetic polymers it is generally preferred to use fibers of the nylon family since not only do they contain readily activatable amide centers, but such amide centers may be readily coupled to proteins using comparatively mild coupling agents which do not denature proteins and which are generally used in the protein art to couple proteins to each other.

Figure 3:
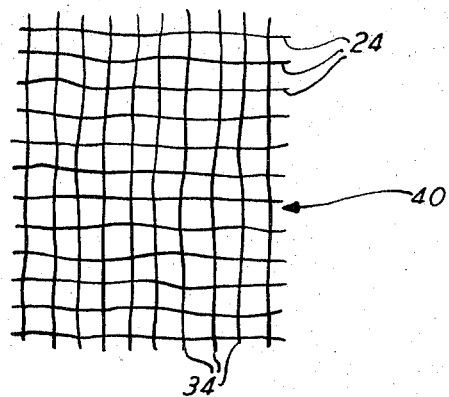
FIG. 3 is a plan view of a portion of the mesh embodiment of the present invention.

In contrast to the nylon fibers of FIG. 1 the mesh of FIG. 3 may be transferred from a vessel containing one medium to a vessel containing another without damage to the adsorbed cells. Circumstances could be foreseen wherein it is desirable to carry out the reactions in a somewhat more controlled environment.

Figure 4:
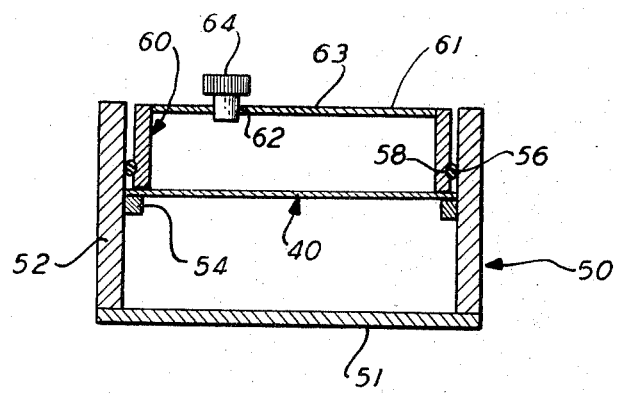
FIG. 4 is a side elevational view of a handling device for manipulation of the mesh of FIG. 3.

Such a controlled environment is illustrated by the carrier of FIG. 4. This carrier comprises a frame 52 having predetermined cross-section. The actual dimensions of the cross-section are not critical. However from a point of view of construction, rectangular, square, or most suitably circular cross-sections are to be preferred. Said frame 52 further comprises a shelf 54 around the inner circumference thereof located aproximately halfway between the top and bottom of the frame 52. There is further provided a retaining means 60 comprising a frame 61 having a cross-section similar to that of frame 52 but having outer dimensions slightly less than the appropriate inner dimensions of frame 52 but greater than the appropriate inner dimensions of shelf 54. The frame 61 is, if desired, further provided with means for retaining itself within frame 52. In the preferred embodiment thereof, there is provided a groove 58 in the outer circumference of frame 61 and an O-ring 56 in said groove whereby the outer diameter of O-ring 56 when located in groove 58 is slightly greater than the internal dimensions of frame 52, but may, by slight compression be compressed to conform to said dimensions.

If desired, frame 52 may be further provided with a bottom plate 51 and frame 61 may be provided with a top plate 63 suitably having an opening 62 provided therein and a stoppering means 64 for removably sealing opening 62.

Mesh 40 when utilized in the device of FIG. 5 is placed upon shelf 54 and held thereon by retaining means 60.

Proteins possess amino and carboxyl groups which are available active centers for coupling with the fibers. It is generally preferred to utilize fibers having amino and/or carboxyl groups such as polyamides, polyesters or acrylics. Where there are utilized fibers having carbohydrate back-bones the hydroxyl groups thereon must be activated for coupling with proteins.

The coupling procedures utilized are substantially the same whether the filaments are strung onto a retaining frame or utilized in the form of a mesh. In the following discussions it will be assumed that the fibers referred to are in one or the other of these physical orientations.

The surface contaminants of the fibers are removed suitably by solvent extraction. It has been found useful to extract the fibers at ambient temperatures for from about 10 to about 30 minutes first with petroleum ether and then with carbon tetrachloride. Where fibers having amino groups thereon, such as polyamides or polyacrylics are utilized they are sensitized by partial acid hydrolysis suitably with an acid such as hydrochloric acid for example, 3N hydrochloric acid at ambient temperature for from about 15 to about 60 minutes. The fibers are then washed with water for from about 1 to about 2 hours and are then ready for coupling. A large variety of coupling agents may be employed. Among the coupling agents for amino groups may be mentioned 1-cyclohexyl-3-(2-morpholinoethyl)-carbodiimide metho-p-toluenesulfonate, 1-ethyl-3-(3-dimethylaminopropyl)-carbodiimide hydrochloride, glutaraldehyde, difluorodinitrobenzene, dimethyladipimidate, phenol-2,4-disulfonylchloride, hexamethylenediisocyanate, tosyl chloride/sodium ethoxide, cyanogen bromide p,p-difluoro-m,m-dimitrodiphenylsulfone, Woodward's Reagent K; among the coupling agents for carboxyl groups may be mentioned, 1-cyclohexyl-3-(2-morpholinoethyl)-carbodiimide metho-p-toluenesulfonate, 1-ethyl-3-(3 - dimethylaminopropyl)carbodiimide hydrochloride, Woodward's Reagent K; among the coupling agents for phenolic groups may be mentioned, diazo reagents such as bisdiazobenzidine, p,p'-difluoro-m,m'-dinitrodiphenyl sulfone, 1,5,-difluoro-2,4-dinitrobenzene, 1-cyclohexyl-3-(2-morpholinoethyl)-carbodiimide metho-p-toluenesulfonate, 1-ethyl-3 - (3 - dimethylaminopropyl)carbodiimide hydrochloride; among the coupling agents for sulfhydryl groups may be mentioned, N,N'-(1,3-phenylene)bismoleimide, N,N'-ethylene-bis-(iodoacetamide).

As stated heretofore, it is especially preferred to utilize mono-filament nylon or mesh woven from monofilament nylon. It has been found especially suitable to utilize as a coupling agent for nylon fibers reagent commonly known "carbodiimide" (1-cyclohexyl-3 - (2 - morpholinoethyl)-carbodiimide metho-p - toluenesulfonate, Aldrich Chemical, Milwaukee, Wis.). In this procedure the fibers are placed in a freshly prepared solution of the antigenic protein and carbodiimide suitably in slightly acid saline. It has been found practical to utilize protein concentrations in the range of 0.1 mg./ml. to 10 mg./ml. and "carbodiimide" at a "carbodiimide" to protein ratio of about 5:1 (w./w.). It is generally preferred to utilize a saline reaction solution of from about 0.1 to about 0.5, suitably about 0.15 molar to a pH of between about 5.5 and about 6.5. The reaction mixture is agitated at ambient temperatures for from about 15 to about 16 minutes and the fibers washed in phosphate buffered saline. They are stored in this medium until the lyophilization step discussed hereinbelow.

It should be noted that carbodiimide is a nonbonding reagent, that is to say, when carbodiimide is used the protein is directly bonded to the fiber. However most of the other coupling agents listed hereinabove are participating bonding agents, that is to say, at least a portion thereof forms bond with the fiber and another portion thereof forms a bond with the protein. The simplest and most readily used of these reagents is cyanogen bromide.

Where cyanogen bromide is utilized the sensitized fibers are immersed in water and the pH adjusted to from about 10 to about 11, suitable to about 10.5 with dilute alkali, suitably 0.1N sodium hydroxide, and, approximately 1% (w./w.) solution of cyanogen bromide is added to this alkaline medium with agitation. The reaction is permitted to proceed for from about 5 to about 10 minutes, the fibers removed, washed with water, and transferred to a very slightly acid potassium phosphate buffer. Protein, at a concentration of between about 1 to about 2 milligrams/ml. in slightly acid saline is added and the reaction mixture gently agitated suitably overnight, at about 5° C. The fibers are then removed, and washed with saline before use or storage.

It should be recognized that the degree of coupling, that is to say, the number of protein molecules per unit length of fiber may be finely controlled as a result of variation of a number of factors. Among the more important of these factors are initial protein concentration, the coupling reagent to protein ratio, time of reaction, pH and temperature. Thus increasing the ratio of coupling reagent to protein increases the extent of derivatization. This effect is also achieved by increasing the time of reaction or increasing the pH. However, with regard to the latter two factors, it should be noted that carbodiimide undergoes gradual hydrolysis, therefore if the reaction time is increased, it is desirable to add fresh carbodiimide after 2 to 3 hours of reaction. The permissible pH reaction range lies between 4.5 and 8, however, the true availability of this range will depend upon the stability of the particular protein utilized.

As stated heretofore, the manner of carrying out the lyophilization procedure is critical to the preservation of immunoreactivity and native structure in the coupled protein. As stated heretofore after the coupling step the coated fibers are thoroughly washed in phosphate buffered saline. It is necessary to then remove all inorganic salts and this is done by thorough agitation in at least 2 washes of glass distilled water. The fibers, either in the frame or in mesh form, are then transferred into a lyophilization jar containing sufficient water to totally immerse the fibers. The jar is then swirled in a cooling bath, suitably a Dry-Ice/ethanol bath so that a film of ice is formed in the jar covering the fibers. The jar is then connected to a vacuum pump and the water removed by sublimation in the usual manner. The thus derivatized, dry, protein coated fibers may then be stored and can be conserved to have a substantially indefinite shelf life provided that they are kept dry, at ambient temperatures or below, and the surface thereof is not handled in any way. The unlyophilized derivatized fibers may, of course, be utilized when formed without lyophilization.

In the embodiment of the present invention wherein nylon filaments, per se, are utilized, the fibers in their frames are placed under the surface of a medium containing the cells to be fractionated, which bear immunoreactive factors having molecular complementarity with the immunoreactive groups on the fibers. For example, where spleen cells are to be fractionated, it is desirable to utilize a saline solution such as Hank's balanced salt solution without sodium bicarbonate (Grand Island Biological Company). The cells are added to the saline and the fibers placed below the surface of the medium. The vessel containing both the medium and the fibers is placed on a horizontal shaker and the fibers are lined perpendicular to the direction of shaking, care being taken however to insure that the fibers at all times remain covered by the medium. It has been found suitable to utilize a shaker having a 3.3 centimeter stroke at about 78 oscillations per minute. After binding is complete the entire assembly is immersed in phosphate buffered saline and, if desired, the fibers removed therefrom, still under the surface of the saline, in a petri dish. Where it is desired to remove the cells from the fibers, the fibers are plucked under the surface of the medium and the cells thus ejected from contact with the fiber.

In an alternate modification of the method, utilizing a container as illustrated in FIG. 5, the medium containing the cells is inserted into the upper sector 60 through opening 62, the air removed from the entire device and the sealing means 64 closed. The device is then placed upon a horizontal shaker oscillating at approximately 200 r.p.m. for 1 hour at reduced temperatures, suitably around 4° C. The cell suspension is permitted to trickle through mesh 40 under gravity and the entire device inverted every approximately 15 minutes during shaking to facilitate pick-up of the cells by the mesh. Since the mesh retains fluid in its interstices, the surface tension problem of the single filaments is not encountered. After the adsorption is complete, the mesh is removed from the device, washed by gentle agitation in, for example, phosphate buffered saline, and placed in a dish into which it is desired to eject the adsorbed cells into a medium in said dish. The cells are washed off the mesh by jetting a fine rapidly flowing stream of water through the mesh whereby the cells are sheared from the fibers.

It should be noted however that in order to study the cells adsorbed in this procedure, it is not necessary to eject them into a neutral medium. For example, if the purpose of the study is the assay of cells of a particular type in a particular fluid, this may be carried out by viewing the filament or the mesh through a suitable magnifying device and counting the cells adsorbed along a given length of fiber. This procedure permits the cells to be counted in situ.

It may be demonstrated that the method is substantially specific for a given antigen-antibody response. Certain synthetic antigens were prepared such as DNP-bovine serum albumin (known as $DNP_8$-BSA), toluene sulfonyl-BSA (also known as $tosyl_{20}$-BSA), BSA itself, and sonicated stroma were injected into the mice and after a certain interval the spleens of the mice removed and the spleen cells studied by the procedures of the present invention. Table I below shows the binding of the spleen cells to fibers coated with these specific antigens.

TABLE I

Binding of mouse spleen cells to antigen-derivatized fibers

| Fiber antigen [1] | Number of cells bound [2] | |
|---|---|---|
| | Immunized [3] | Unimmunized |
| DNP-BSA: | | |
| Exp. 1 | 802 | 285 |
| Exp. 2 | 1,004 | 301 |
| Exp. 3 | 654 | 283 |
| Tosyl-BSA: | | |
| Exp. 1 | 353 | 143 |
| Exp. 2 | 297 | 130 |
| BSA: | | |
| Exp. 1 | 173 | 65 |
| Exp. 2 | 112 | 58 |
| Stroma: | | |
| Exp. 1 | 160 | 75 |
| Exp. 2 | 145 | 70 |

[1] The DNP-BSA ane Tosyl-BSA fibers were coated with $10^{11}$ and $2\times 10^{11}$ antigen molecules per cm., respectively.
[2] Expressed as number of cells bound to both edges of a 2.5-cm. fiber segment.
[3] Secondary responses to $DNP_{38}$-BGG [bovine gamma globulin (fraction II), Armour Pharmaceutical], $Tosyl_{30}$-BSA, BSA, and sheep rythrocytes, respectively. Cells from three mice were polled.

In a further experiment, the soluble antigen was added to the spleen cell suspension prior to the immersion therein of the antigen coated fibers. Table II shows that the specific antigen in soluble form caused substantial inhibition while foreign antigens were ineffective for this purpose.

TABLE II

Specific inhibition of spleen cell binding to derivatized fibers

| Fiber antigen | Immunogen | Inhibitor [a] | | | |
|---|---|---|---|---|---|
| | | DNP | Tosyl | Stroma | Anti $I_g$ |
| DNP-BSA | DNP-BGG | [b]91 | 1 | | 93 |
| DNP-BSA | None | 73 | 2 | | 72 |
| Tosyl-BSA | Tosyl-BSA | 3 | 87 | | 90 |
| Do | None | 6 | 59 | | 63 |
| Stroma | Stroma | <5 | <5 | 70 | 80 |
| Do | None | <5 | <5 | 50 | 45 |

[a] All values are espressed as percent inhibition.
[b] $DNP_8$-BSA and $Tosyl_{20}$-BSA present at 200 μg./ml.; sonicated stroma and rabbit anti-mouse immunoglobulin at a concentration of 1 mg./ml.

In a further embodiment of the invention thymocytes may be selectively isolated from erythrocytes.

The method may be adopted either for the isolation of erythrocytes or the isolation of thymocytes.

In this embodiment fibers under tension, suitably nylon fibers in the form of fibers tensioned on a retaining frame or in the form of fibers woven into a mesh are derivatized with Concanavalin A at concentrations of between about $7\times 10^{11}$ and about $1\times 10^{11}$ molecules of Concanavalin A per centimeter of fiber.

At the higher level of concentration, both thymocytes and erythrocytes are absorbed, however, treatment with a hypotonic solution of an inhibitory sugar containing the α-methyl-D-mannosyl, α-D-mannopyranosyl, α- and β-glucopyranosyl or β-D-fractofuranosyl moieties or polysaccharides containing these groups at their non-reducing termini. Suitably, α-methylmannoside causes the selective release of erythrocytes. Both the osmolarity and the concentration of the inhibitory sugar. If the latter is too high or too low the viability of the cells will be destroyed. If the inhibitory concentration is too low the erythrocytes are not released. It is generally preferred to utilize an osmolarity of between about 100 and about 300mOsM suitably about 150mOsM containing inhibitory concentration of between about 0.01 to about 0.07M, preferably between about 0.04 and 0.05M of the inhibiting sugar. Among the suitable inhibitors may be mentioned: D-glucose, 1,5-anhydro-D-glucitol, 2-deoxy-1,5-anhydro-D-arabino-hexitol 2-deoxy-D-glucose, 2-O-Methyl-D-glucose, N-acetyl-D-glucosamine M-α-D-glucopyranoside, Methyl-β-D-glucopyranoside. D-manniose, methyl-α-D-mannopyranoside, D-fructose, L-sorbose, methyl-α-L-sorbopyrannoside, maltose, isomaltose, niguose, kojibiose, α,α-trehalose, sucrose, furanose, 3-O-α-D-glucopyranosyl-D-arabinose, maltotriose, isomaltotriose, panose, melezitose.

Unfortunately however, at the higher level of concentration the thymocytes are so tightly bound that upon mechanical release thereof in the manner discussed hereinabove by plucking the fibers in a medium compatible with the viability of the cells a substantial proporation of the thymocytes may be so mechanically damaged as to be no longer substantially viable. Thus, if it is desired to isolate the thymocytes rather than the erythrocytes there should be utilized fibers coated wtih a Concanavalin A concentration of less than $2 \times 10^{11}$ suitably $1 \times 10^{11}$ to $1.5 \times 10^{11}$ molecule Concanavalin A per centimeter of fiber. At the lower end of this concentration range erythrocytes are not absorbed, therefore in the separation procedure it is not essential to utilize the intermediate erythrocyte release step using the inhibitory sugar. It will be understood however by those skilled in the art that by lowering the concentration of Concanavalin A the number of erythrocytes isolated will correspondingly be reduced. Therefore, it may be desirable to effect a compromise whereby the level of Concanavalin A concentration is raised to a point at which some erythrocytes are adsorbed, but the adsorption of the thymocytes is not so strong that excessive mechanical damage at the release step.

Where a small amount of adsorption of erythrocytes does occur, they can be chemically released by the use of inhibitory sugars as discussed hereinabove.

It is generally preferred to utilize nylon fibers either in the frame tensioned form or in the mesh form of the order of 150 microns in diameter. These are coupled with Concanavalin A preferably using carbodiimide as the coupling agent by the general methods of coupling discussed hereinabove. Utilizing these procedures it has been found that utilizing an initial concentration of 1 milligram/ml. of Concanavalin A there is obtained a coating of $2 \times 10^{11}$ Concanavalin A molecules per centimeter of fiber. Whereas under identical reaction conditions where 5 milligrams/ml. of Concanavalin A are utilized there is obtained a coating of $7 \times 10^{11}$ molecules of Concanavalin A per centimeter of fiber. The extent of the coupling of Concanavalin A to the fiber can be determined using radiolabeled Concanavalin A and measuring the radioactivity of the fibers by methods well known in the art.

EXAMPLE I

Transparent nylon mono-filaments (size 50 sewing nylon, Dyno Merchandise Corporation, Elmhurst, N.Y.) are strung onto polyethylene collars cut from hollow-S6 stoppers (Mallinckrodt, New York, N.Y.). These fit snugly into 35 x 10 mm. petri dishes (NUNC, Vanguard International, Inc., Red Bank, N.J.) and hold the fibers under tension. Surface contaminants are removed by ten-minute extraction of the fibers by immersion first in petroleum ether for 15 minutes with agitation, the petroleum ether is discarded and the fibers are then washed for a further 15 minutes with carbon tetrachloride, which is then also discarded. The fibers are then immersed in 3N hydrochloric acid for 30 minutes at ambient temperature followed by washing in one liter distilled water for 1 hour. A solution of DNP-bovine serum albumin (0.5 mg./ml.) and "carbodiimide" 2.5 mg./ml. solutions are prepared in 0.15M aqueous sodium chloride, pH 6.0. The reaction mixture is agitated at ambient temperature for 30 minutes, the fibers on the polyethylene collars are then washed in phosphate buffered saline, pH 7.4 (8.0 g. sodium chloride, 0.20 g. potassium chloride, 0.20 g. potassium dihydrogenphosphate, and 0.15 g. of disodium hydrogenphosphate per liter). After washing the fibers are transferred to fresh containers containing the same medium until the lyophilization step described hereinbelow.

EXAMPLE II

The nylon threads are tensioned and cleaned in accordance with the procedure of Example I. The clean threads are immersed in 100 ml. water, and the pH adjusted to pH 10.5 by the addition of 0.1N sodium hydroxide. A solution of 200 mg. cyanogen bromide in 160 ml. of water is slowly added to the water in which the nylon threads are immersed and the pH held at pH 10 to pH 10.5, with agitation, for between 8 and 10 minutes. The threads are washed with cold water, and transferred to a vessel containing 100 ml of 0.1M potassium phosphate buffer (pH 6.5), and 50 ml. of a saline solution of DNP-bovine serum albumin (1.0 mg./ml., 0.5M sodium chloride). The mixture is stirred for 8 hours at 4° C., and the fibers washed in 0.15M saline before the lyophilization step.

EXAMPLE III

In accordance with the procedure of Examples I and II but where in place of nylon threads tensioned on a frame there is utilized a nylon mesh namely 308 gage, square-weave, Nitex (Tobler, Ernst and Traber, New York, N.Y.). The mesh is derivatized in the same manner as the individual threads.

EXAMPLE IV

Lyophilization Procedure

The derivatized fibers, either in tensioned form on the frame, or in mesh form, as produced in Examples I through III, are thoroughly washed with phosphate buffered saline, and twice with glass distilled water. The fibers are then transferred to a lyophilization jar (Virtis Co., Gardiner, N.Y.) containing sufficient water to totally immerse the fibers. The jar is then swirled in a Dry Ice/ethanol bath to freeze the water in such a manner as to provide total covering for the fibers. The jar is then connected to a vacuum pump and sublimated to dryness.

EXAMPLE V

In accordance with the procedures of Examples I through IV but utilizing in place of DNP-bovine serum albumin, tosyl bovine serum albumin, bovine serum albumin, sonicated stroma, there are similarly obtained lyophilized coatings of said proteins upon the nylon fibers or meshes.

In accordance with the foregoing procedures where there are used in place of nylon, Nylon 6T, Nomex, Dacron, Terylene, Orlon, Dralon or Acrylan, there are similarly obtained fibers bearing the lyophilized proteins thereupon.

EXAMPLE VI

Transparent nylon mono-filament (size 50 sewing nylon, Dyno Merchandise Corporation, Elmhurst, N.Y.) are strung onto polyethylene collars cut from hollow-S6 stoppers (Mallinckrodt, New York, N.Y.). These fit snugly into 35 x 10 mm. petri dishes (NUNC, Vanguard International, Inc., Red Bank, N.J.) and hold the fibers under tension. Surface contaminants are removed by ten-minute extraction of the fibers by immersion first in petroleum ether for 15 minutes with agitation, the petroleum ether is discarded and the fibers are then washed for a further 15 minutes with carbon tetrachloride, which then also discarded. The fibers are then immersed in 3N hydrochloric acid for 30 minutes at ambient temperature, followed by washing in one liter distilled water for 1 hour. A solution of Concanavalin A (1.0 mg./ml.) and "carbodiimide" 5.0 mg./ml. solutions are prepared in 0.15M aqueous sodium chloride, pH 7.4 (8.0 g. sodium chloride, 0.20 g. potassium chloride, 0.20 g. potassium dihydrogenphosphate, and 0.15 g. of disodium hydrogenphosphate per liter). After washing the fibers are transferred to fresh containers containing the same medium until the lyophilization step described hereinbelow, or direct use. The extent of coupling is determined by utilizing Concanavalin A labeled with $^{63}$Ni by the method of Inbar and Sachs (Nature, 215, 1491 (1967) and measured by the method of Wang et al. (Proc. Nat. Acad. Sci., U.S.A., 68, 1130 (1971). This analysis shows the concentration to be $2 \times 10^{11}$ molecules of Cancanavalin A per cm. of fiber.

In accordance with the above procedure but utilizing 5 mg./ml. of Concanavalin A and 25 mg./ml. of "carbodiimide" there is obtained a coating on the fiber of $7 \times 10^{11}$ molecules on Concanavalin A per cm. of fiber.

EXAMPLE VII

In accordance with the procedure of Example VI but where in place of nylon threads tensioned in a frame there is utilized a nylon mesh namely 308 gage, square-weave, Nitex (Tobler, Ernst and Traber, New York, N.Y.). The mesh is derivatized in the same manner as the individual threads.

EXAMPLE VIII

A cell suspension of $5 \times 10^7$ erythrocytes and $5 \times 10^7$ thymocytes per ml. of phosphate buffered saline is prepared. The fibers coated with $7 \times 10^{11}$ Concanavalin A molecules per centimeter are incubated for 60 minutes at ambient temperature. The reaction solution is diluted with phosphate buffered saline to 10 times its volume, and 9 volumes are removed leaving the fibers below the surface of the medium. This dilution is repeated twice and 9 volumes of a hypotonic solution (150mOsM) containing 0.05M α-methyl-mannoside and 0.05M sodium chloride are added thereto and the fibers under tension agitated for a few minutes. Substantially instantaneous release of the erythrocytes is observed. The volume is again reduced to 1/10 taking care to retain the fibers under the surface of the medium, and 9 volumes of heat inactivated fetal calf serum diluted 1:10 with phosphate buffered saline is added thereto. This medium is again reduced to 1/10 of its volume and 9 volumes of the remaining same medium are added thereto. Inspection of the medium should show that absence of free floating cells. Where free floating cells are observed the volume reduction and dilution steps are repeated until no free cells are observed. The thymocytes adsorbed upon the surface of the fibers are released into the medium by plucking the fibers.

EXAMPLE IX

Nylon filaments under tension in a frame having a concentration of $1 \times 10^{11}$ molecules of Concanavalin A per centimeter are prepared by the method of Example VI utilizing 0.5 milligrams per ml. of Concanavalin A and 2.5 milligrams per ml. of carbodiimide. The thus produced fibers are subjected to the reaction conditions set forth in Example VIII. When the coated fibers are agitated in the α-methyl mannoside/saline the release of erythrocytes is not noted. After mechanical removal by plucking of the cells and incubation thereof in the medium containing fetal calf serum for 1 hour at 37° C. are found to be thymocytes which are 80 to 90% viable. Incubation in phosphate buffered saline alone or substitution of 8% bovine serum albumin for the fetal calf serum leads to reduced cell viability.

EXAMPLE X

A derivatized nylon mesh is prepared in accordance with Example VII and placed in the enclosed version of the device shown in FIG. 4. The dimensions of the device are 35 millimeters external diameter and 8 millimeter depth. The air is removed from the device and 8 ml. of a cell suspension consisting of $1.25 \times 10^7$ erythrocytes and $1.25 \times 10^7$ thymocytes per ml. is added through opening 62 which is then sealed and the device place on horizontal shaker 200 r.p.m. for 1 hours at 4° C. The chamber is inverted every 15 minutes so that the cells filter through the mesh under unit gravity.

The mesh 40 is then removed from the chamber washed in a solution containing 0.05M α-methyl mannoside in 0.05M sodium chloride and then placed in a petri dish containing heat inactivated fetal calf serum diluted 1 to 10 with phosphate buffered saline. The adsorbed thymocytes are released into said medium by jetting a fine stream of water substantially perpendicularly through the fibers of the mesh. It should be noted that where the mesh is utilized rather the tensioned fibers in a frame provided that a film of medium remains in the interstices of the mesh, the mesh may be passed through surface layers of medium provided this is done fairly gently.

EXAMPLE XI

Transparent nylon monofilaments (size 50 nylon, Dyno Merchandise Corporation, Elmhurst, N.Y.) are strung onto polyethylene collars and held under tension. Surface contaminants are removed by ten-minute extraction of the fibers by immersion first in petroleum ether for 15 minutes with agitation, the petroleum ether is discarded and the fibers are then washed for a further 15 minutes with carbon tetrachloride, which is then also discarded. The fibers are then immersed in 3N hydrochloric acid for 30 minutes at ambient temperature, followed by washing in one liter distilled water for 1 hour. A solution of rabbit antiserum against chicken liver (0.1 ml.) and "carbodiimide" (0.01 ml., 100 mg./ml. solutions in 0.15M aqueous sodium chloride, pH 6.0) are added to the fibers and agitated at ambient temperature for 30 minutes, the fibers on the polyethylene collars are then washed in phosphate buffered saline (PBS), pH 7.4 (8.0 g. sodium chloride, 0.20 g. potassium chloride, 0.20 g. potassium dihydrogen phosphate, and 0.15 g. of disodium hydrogen phosphate per liter).

The PBS solution is diluted to ca. 10 times its original volume, 9 volumes removed and a fresh 9 volumes of PBS added and 9 volumes removed. One volume of chicken liver cells in PBS is added and the mixture agitated.

The solution is then diluted as above until no free floating cells are observed; plucking the fibers releases the chicken liver cells into the PBS.

In place of rabbit antiserum against chicken liver, there may be used rabbit antiserum against chicken skin and against chicken neural retina cells. Fibers thus coated are utilized to isolate chicken skin cells and chicken neural retina cells respectively.

We claim:

1. A device for selectively separating cells having predetermined immunoreactive factors attached thereto from a fluid containing said cells comprising:
   (a) a frame,
   (b) fibers under tension attached to said frame,
   (c) and having chemically bonded to said fibers lyophilized material containing immunoreactive groups having molecular complementarity with said predetermined immunoreactive factors capable of forming bonds with said predetermined immunoreactive factors attached to said cells.

2. A device of Claim 1 wherein the immunoreactive groups are antigens and the immunoreactive factors are antibodies.

3. A device according to Claim 1 wherein the immunoreactive groups are antibodies and the immunoreactive factors are antigens.

4. A device of Claim 1 wherein the fibers are selected from the group consisting of fibers having a carbohydrate back-bone, an aminoacid back-bone, polyamides, polyesters, and polyacrylics.

5. A device according to Claim 1 wherein proteinaceous material is directly bonded to the fiber.

6. A device according to Claim 1 wherein proteinaceous material is connected to the fiber through a coupling group.

7. A device of Claim 4 wherein the fibers are selected from synthetic fibers of the group consisting of polyamides, polyesters, and polyacrylics.

8. A device of Claim 4 wherein the fibers are monofilament nylon fibers.

9. A method of preparing a device of Claim 1 which comprises the steps of:
   (I) treating nylon fibers under tension with a predetermined material having immunoreactive groups attached thereto and a coupling agent,
   (II) washing the device with distilled water to remove unreacted said material and coupling agent,
   (III) immersing the device entirely under the surface of distilled water and freezing the water,
   (IV) removing the frozen water by sublimation under reduced pressure.

10. A method of Claim 9 wherein step (I) comprises:
    (a) reacting a protein with the fibers in the presence of a coupling agent.

11. A method according to Claim 10 wherein step (I) comprises the sequential steps of:
    (a) reacting the fibers with a coupling agent, and
    (b) reacting the thus activated fibers with a protein.

12. A device for selectively separating cells having predetermined immunoreactive factors attached thereto from a fluid containing said cells comprising:
    (a) a substantially rigid fiber mesh having at least 2 sets of mutually parallel filaments constituting said mesh, and
    (b) having chemically bonded to said fibers lyophilized material containing immunoreactive groups having molecular complementarity with said predetermined immunoreactive factors capable of forming bonds with said predetermined immunoreactive factors attached to said cells.

13. A device of Claim 12 wherein the immunoreactive groups are antigens and the immunoreactive factors are antibodies.

14. A device according to Claim 13 wherein the immunoreactive groups are antibodies and the immunoreactive factors are antigens.

15. A device of Claim 12 wherein the fibers of said mesh are between 1 and 250 microns in diameter and the distance between the mutually parallel filaments is between 10 microns and 1500 microns.

16. A device according to Claim 12 wherein the diameter of the fibers is between 50 and 150 microns and the distance between parallel filaments is between 100 and 500 microns.

17. A device according to Claim 15 wherein the fibers are selected from synthetic fibers of the group consisting of polyamides, polyesters, and polyacrylics.

18. A device according to Claim 17 wherein the fibers are nylon monofilaments.

19. A method of preparing a device of Claim 12 which comprises the steps of:
    (a) treating nylon fibers mesh with a predetermined material having immunoreactive groups attached thereto and a coupling agent,
    (b) washing the device with distilled water to remove unreactetd said material and coupling agent, (c) immersing the device entirely under the surface of distilled water and freezing the water, (d) removing the frozen water by sublimation under reduced pressure.

20. A method of selecting cells having predetermined immunoreactive factors attached thereto from a fluid containing said cells which comprises the sequential steps of:

(a) immersing below the surface of the fluid, fibers under tension having bonded thereto material containing immunoreactive groups having molecular complementarity with said predetermined immunoreactive factors capable of forming a bond with said immunoreactive factors attached to said cells, (b) agitating said fibers below the surface of said fluid, (c) removing the unbonded material from the environment of the fibers by dilution with a medium compatible with the visability of the cells, (d) removing said added medium and adding further quantities of the medium until all non-adsorbed cells in the original fluid have been removed while maintaining the fibers below the surface of the medium.

21. A process according to Claim 20 additionally comprising the step of:

(a) removing the cells attached to the fibers by plucking said fibers under the surface of said medium whereby said adsorbed cells are released into said medium.

22. A method of selecting cells having a predetermined immunoreactive factors attached thereto from fluids containing said cells which comprises the sequential steps of:

(a) immersing a fiber mesh having bonded to the fibers thereof materials containing immunoreactive groups having molecular complementarity with said predetermined immunoreactive factors, capable of forming a bond with said immunoreactive factors attached to said cells, in said fluid containing said cells, (b) immersing said mesh in a medium compatible with a visbility of said cells.

23. A method according to Claim 22 additionally comprising the step of:

(a) directing a fine jet of water through said mesh substantially perpendicular to the plane thereof, whereby the cells are dislodged from the fibers.

References Cited

UNITED STATES PATENTS

| | | | |
|---|---|---|---|
| 3,655,838 | 4/1972 | Price | 424—12 UX |
| 3,658,982 | 4/1972 | Reiss | 424—12 |
| 3,692,486 | 9/1972 | Glenn | 23—230 B |
| 3,720,760 | 3/1973 | Bennich | 23—230 B X |
| 3,721,528 | 3/1973 | Mead | 23—230 B |
| 3,736,100 | 5/1973 | Rains | 23—230 B X |
| 3,188,181 | 6/1965 | Peterson | 424—12 X |
| 3,389,966 | 6/1968 | Saravis | 23—230 B |
| 3,551,555 | 12/1970 | Hermanus | 424—12 |
| 3,562,384 | 2/1971 | Arquilla | 424—12 |
| 3,607,783 | 9/1971 | Tata | 23—230 B X |
| 3,619,371 | 11/1971 | Crook | 424—12 |
| 3,639,558 | 2/1972 | Csizmas | 424—12 |
| 3,645,687 | 2/1972 | Nerenberg | 424—12 X |
| 3,645,852 | 2/1972 | Axen | 424—12 X |
| 3,646,346 | 2/1972 | Catt | 424—12 X |
| 3,652,761 | 3/1972 | Weetall | 424—12 |

OTHER REFERENCES

G. M. Edelman, U. Rutishauser and C. F. Millette, Proc. Nat. Acad. Sci., 68 (9), 2153–57, (September 1971).

MORRIS O. WOLK, Primary Examiner

S. MARANTZ, Assistant Examiner

U.S. Cl. X.R.

23—259; 117—119.2, 138.8 N; 195—66 R; 424—12